United States Patent [19]

Matsuyama

[11] Patent Number: 5,307,448
[45] Date of Patent: Apr. 26, 1994

[54] ELECTRONIC APPARATUS WITH DISPLAY DEVICE

[75] Inventor: Shigeru Matsuyama, Yokohama, Japan

[73] Assignee: Canon Kabushiki Kaihsa, Tokyo, Japan

[21] Appl. No.: 882,750

[22] Filed: May 11, 1992

Related U.S. Application Data

[63] Continuation of Ser. No. 554,157, Jul. 19, 1990, abandoned, which is a continuation of Ser. No. 862,627, May 13, 1986, abandoned.

[30] Foreign Application Priority Data

| May 24, 1985 | [JP] | Japan | 60-110148 |
| May 24, 1985 | [JP] | Japan | 60-110149 |
| May 24, 1985 | [JP] | Japan | 60-110150 |

[51] Int. Cl.⁵ .................................. G06F 3/12
[52] U.S. Cl. ............................ 395/112; 395/115; 395/116
[58] Field of Search ............ 395/162, 163, 164, 110, 395/116, 112, 115; 400/63, 83, 549; 340/784; 354/5

[56] References Cited

U.S. PATENT DOCUMENTS

| 4,121,228 | 10/1978 | Cowe et al. | 354/7 |
| 4,194,833 | 3/1980 | Lester et al. | 354/5 X |
| 4,527,917 | 7/1985 | Ueno | 400/63 |
| 4,557,615 | 10/1985 | Ueno | 364/519 |
| 4,615,631 | 10/1986 | Ueda et al. | 400/63 |
| 4,728,964 | 3/1988 | Sasaki | 346/33 R |
| 4,733,248 | 3/1988 | Hibino | 346/33 R |
| 4,768,164 | 8/1988 | Dreher | 364/900 |

OTHER PUBLICATIONS

Electronics Display-Sol Sherr-1979 pp. 438-450 A Wiley-Interscience Publication.

*Primary Examiner*—Phu K. Nguyen
*Attorney, Agent, or Firm*—Fitzpatrick, Cella, Harper & Scinto

[57] ABSTRACT

An electronic apparatus such as an electronic typewriter includes a display device and has a plurality of modes of operation selectable by an operator. The operation mode selected by the operator is displayed on the display device that can also display character data input to the apparatus by an input device such as a keyboard. The display device displays the selected mode after displayed character data is printed in response to the operation, for example, of a carriage return key when a line-by-line printing mode is selected or a space key when a word-by-word printing mode is selected.

14 Claims, 8 Drawing Sheets

| PROCEDURE | OPERATION | CP | MODE PR | MODE SP | DISPLAY ( ▇ REPRESENTS CURSOR ) | PRINT |
|---|---|---|---|---|---|---|
| 1-1 | POWER ON | 1 | WP | SP-1 | WP      SP-1 | |
| 1-2 | [C] | 2 | WP | SP-1 | C▇ | |
| 1-3 | [A][N][O][N] | 6 | WP | SP-1 | CANON▇ | |
| 1-4 | [SP] | 1 | WP | SP-1 | WP      SP-1 | CANON ▇ |
| 1-5 | [S][1][0] | 4 | WP | SP-1 | S10▇ | |
| 1-6 | [LP] | 4 | LP | SP-1 | S10▇ | |
| 1-7 | [SP] | 5 | LP | SP-1 | S10 ▇ | |
| 1-8 | [$][2][6][9] | 9 | LP | SP-1 | S10 $269▇ | |
| 1-9 | [RETURN] | 9 / 1 | LP | SP-1 | S10 $269▇ / LP      SP-1 | CANON  S10  $269 ▇ |

FIG. 1

| PROCEDURE | OPERATION | CP | MODE PR | MODE SP | DISPLAY (▥ REPRESENTS CURSOR) | PRINT |
|---|---|---|---|---|---|---|
| 1-1 | POWER ON | 1 | WP | SP-1 | WP  SP-1▥ | |
| 1-2 | [C] | 2 | WP | SP-1 | C▥ | |
| 1-3 | [A][N][O][N] | 6 | WP | SP-1 | CANON▥ | CANON▥ |
| 1-4 | [SP] | 1 | WP | SP-1 | WP  SP-1▥ | |
| 1-5 | [S][1][0] | 4 | WP | SP-1 | S10▥ | |
| 1-6 | [LP] | 4 | LP | SP-1 | S10▥ | |
| 1-7 | [SP] | 5 | LP | SP-1 | S10 ▥ | |
| 1-8 | [$][2][6][9] | 9 | LP | SP-1 | S10 $269▥ | |
| 1-9 | [RETURN] | 9 / 1 | LP | SP-1 | S10 $269▥ <br> LP  SP-1▥ | CANON  S10  $269▥ |

| PROCEDURE | OPERATION | CP | MODE PR | MODE SP | DISPLAY (⸺ REPRESENTS CURSOR) | PRINT |
|---|---|---|---|---|---|---|
| 2-1 | POWER ON | 1 | WP | SP-1 | ⸺ | |
| 2-2 | [C] | 2 | WP | SP-1 | C⸺ | |
| 2-3 | [A][N][O][N] | 6 | WP | SP-1 | CANON⸺ | |
| 2-4 | [SP] | 1 | WP | SP-1 | ⸺ | CANON □ |
| 2-5 | [LP] | 1 | LP | SP-1 | LP  SP-1⸺ | |
| 2-6 | [S][1][0] | 4 | LP | SP-1 | S10⸺ | |

FIG. 4

| PROCEDURE | OPERATION | CP | MODE PR | MODE SP | DISPLAY (⸺ REPRESENTS CURSOR) | PRINT |
|---|---|---|---|---|---|---|
| 3-1 | POWER ON | 1 | WP | SP-1 | ⸺ | |
| 3-2 | [C] | 2 | WP | SP-1 | C⸺ | |
| 3-3 | [A][N][O][N] | 6 | WP | SP-1 | CANON⸺ | |
| 3-4 | [SP] | 1 | WP | SP-1 | ⸺ | CANON □ |
| 3-5 | [LP] | 1 | LP | SP-1 | ⸺ | |
| 3-6 | [S][1][0][SP] | 5 | LP | SP-1 | S10 ⸺ | |
| 3-7 | [$][2][6][9] | 9 | LP | SP-1 | S10 $269⸺ | |
| 3-8 | [RETURN] | 1 | LP | SP-1 | S10 $269⸺<br>LP  SP-1 | CANON  S10 $269 □ |
| 3-9 | [A] | 2 | LP | SP-1 | A⸺ | |

ELECTRONIC APPARATUS WITH DISPLAY DEVICE

This application is a continuation of application Ser. No. 07/554,157 filed Jul. 19, 1990, now abandoned, which is a continuation of application Ser. No. 06/862,627 filed May 13, 1986, now abandoned.

BACKGROUND OF THE INVENTION

1. Field of the Invention

The present invention relates to an electronic apparatus having functions which are performed in various operation modes. More particularly, the present invention is concerned with an electronic apparatus such as an electronic typewriter which is operative in various operation modes such as a word-by-word printing mode in which printing is conducted in a word-by-word fashion, a line-by-line printing mode in which printing is conducted in a line-by-line fashion, a line space mode which determines the amount of feed of the print paper, and so forth.

2. Description of the Prior Art

A typical known electronic apparatus of the kind to which the subject invention relates, in addition to display segments for displaying input characters and words, includes indicators such as LEDs for indicating the operation modes chosen by the operator through operation of keys or buttons.

However, it is difficult to find a suitable location for the installation of the operation mode indicators, in the limited area on the panel or the keyboard of the electronic apparatus. In addition, the cost of production of the electronic apparatus may become unacceptably high when such operation mode indicators are provided.

SUMMARY OF THE INVENTION

Accordingly, an object of the present invention is to provide an electronic apparatus with a display device which is capable of displaying an operation mode when a memory means for storing input character data is still empty.

Another object of the present invention is to provide an electronic apparatus with a display device which is capable of displaying an operation mode when a printing instruction for printing input character data is given to the electronic apparatus.

Still another object of the invention is to provide an electronic apparatus having a display which is capable of displaying mode data in response to operation of mode setting keys.

A further object of the invention is to provide an electronic apparatus with a display device which is capable of displaying mode data in response to operation of specific keys.

To these ends, the present invention provides an electronic apparatus that is operable in at least one mode. A selecting device selects the mode in which the apparatus is to operate and an input device inputs character data to the apparatus. A memory stores the character data so input and a detector detects character data stored in the memory. A display device displays the mode of operation of the apparatus when the detecting device fails to detect storage of character data in the memory device.

The present invention may also provide an electronic apparatus having an input device, a memory, and a display device as set forth above, and further having a printer for printing character data stored in the memory, and a mode setting device for selecting a mode of operation of the apparatus. A printing instruction generator generates a printing instruction to the printing device to cause it to print character data stored in the memory. Finally, a control enables the display device to display the mode selected by the mode setting device in response to generation of a printing instruction by the printing instruction device.

In more detail, the present invention may provide an electronic apparatus which has a plurality of mode setting keys for selecting any one of a plurality of modes of operation thereof and a mode memory for storing the one mode selected by the mode setting keys. A control may cause the display device to display the mode stored in the mode memory in accordance with operation of the mode setting keys.

The display device may also display the mode stored in the mode memory in response to actuation of its specific key. Still further, the control may control termination of display of the mode by the display device.

These and other objects, features and advantages of the present invention will become clear from the following detailed description of the preferred embodiments taken in conjunction with the accompanying drawing.

BRIEF DESCRIPTION OF THE DRAWINGS

FIG. 3 shows how FIGS. 3A and 3B are assembled to together form a flow chart illustrating the flow of operations which are executed by a control unit incorporated in the first embodiment;

FIG. 5 shows how FIGS. 5A and 5B are assembled to together form a flow chart illustrating the flow of operations which are executed by a control unit incorporated in the second embodiment;

FIG. 7 shows how FIGS. 7A and 7B are assembled to together form a flow chart illustrating the flow of operations which are executed by a control unit incorporated in the third embodiment.

DESCRIPTION OF THE PREFERRED EMBODIMENTS

A. Description of the First Embodiment

An electronic apparatus such as an electronic typewriter in accordance with a first embodiment of the present invention will be described hereinafter.

The first embodiment is designed so that various mode data are displayed on a display device only after the completion of printing of characters input through keys, i.e., only when the display of these input characters is no longer necessary. When a line-by-line printing mode or a word-by-word printing mode has been chosen, the printing does not occur in response to the operation of the character keys alone, but rather occurs respectively in response to actuation of a carriage return key or a space key. Namely, in accordance with the first embodiment, the display device first displays the characters input through the character keys and, after these characters are printed in response to depression of the carriage return key or the space key, these characters disappear from the display and the current mode data of operation is instead displayed on the display device.

Figure 1:
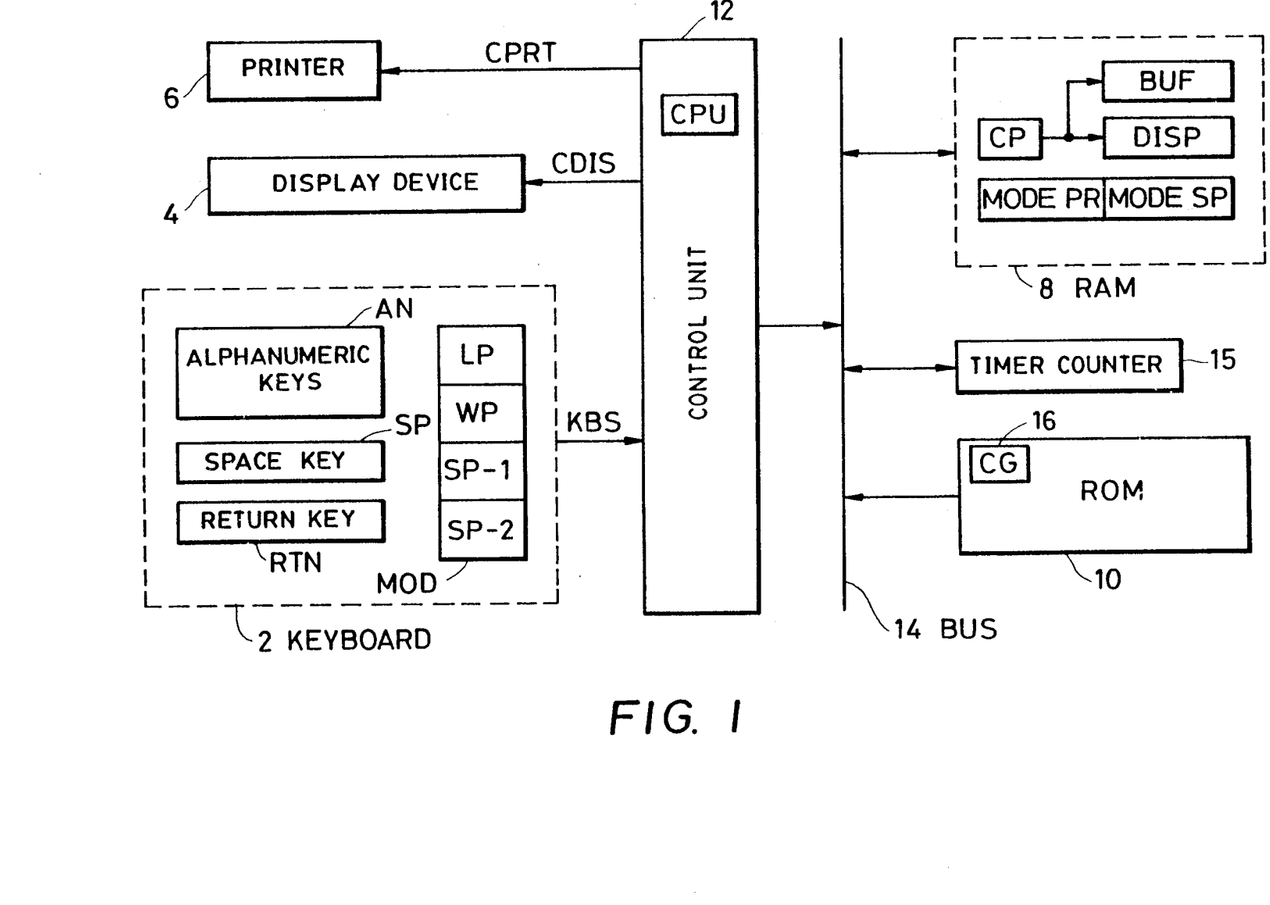
FIG. 1 is a block diagram of a first embodiment of the electronic apparatus of the present invention.

FIG. 1 is a block diagram of an electronic typewriter constituting the first embodiment of the invention. The typewriter has a keyboard 2 on which are arranged alphanumeric keys AN, a space key SP, a carriage return or line change key RTN, and mode setting keys MOD for designating one of several operation modes.

More specifically, the mode setting keys MOD include a line-by-line printing mode key LP for designating the line-by-line printing mode, a word-by-word printing mode key WP for designating the word-by-word printing mode, a first line space key SP-1 for designating a first amount of paper feed (referred to as "first line space mode", hereinafter), and a second line space key SP-2 for designating a second amount of paper feed (referred to as "second space mode", hereinafter).

The electronic typewriter also has a display device 4 which incorporates a liquid crystal display unit of the dot-matrix type. The display device 4 is capable of displaying, in response to a display control signal from a control unit 12, one line of alphanumeric characters input by the alphanumeric keys AN. The content of the display corresponds to the content of a display memory DISP in a random access memory (RAM) 8 which will be explained later. The display device also displays, in accordance with a control flow of functions which will be explained later, the mode of operations which has been selected by actuation of one of the mode setting keys MOD.

The electronic typewriter further has a printer 6 which prints the input alphanumeric characters on a printing paper, in accordance with a print control signal CPRT derived from the control unit 12.

The reference numeral 8 denotes the random access memory (referred to as "RAM" hereinafter) adapted to store the states of operation of the elements mentioned before, as well as the alphanumeric characters and operation mode input through the keys on the keyboard.

The RAM 8 has the following work areas:

(1) A printing buffer BUF which stores the character information to be printed by the printer 6;

(2) The display memory DISP which stores the alphanumeric information to be displayed;

(3) A cursor pointer CP which designates the position of a cursor on the display device 4; and (4) A printing mode memory MODE PR and a space mode memory MODE SP adapted to store the operation mode designated by the mode setting keys MOD on the keyboard 2.

A reference numeral 10 designates a read only memory (referred to as "ROM" hereinafter) which stores the procedure (groups of micro instructions) of control to be performed by the control unit 12 the procedure of control following the flow charts shown in FIGS. 3A and 3B, 5A and 5B and 7A and 7B. The ROM 10 includes a character generator 16 which outputs character patterns to be displayed and printed. The control unit 12 is a sequence control circuit device incorporating a microprocessor CPU, and contains various logical circuits ALU such as a clock pulse generating circuit, delay circuits and gate circuits.

Exchange of data and memory addresses between the memories 8 and 10 and the control unit 12 is conducted through a BUS line 14. A timer counter 15 is adapted to deliver an interrupt signal to the control unit 12 in a predetermined elapsed time after the display of the mode on the display device.

Figure 2:
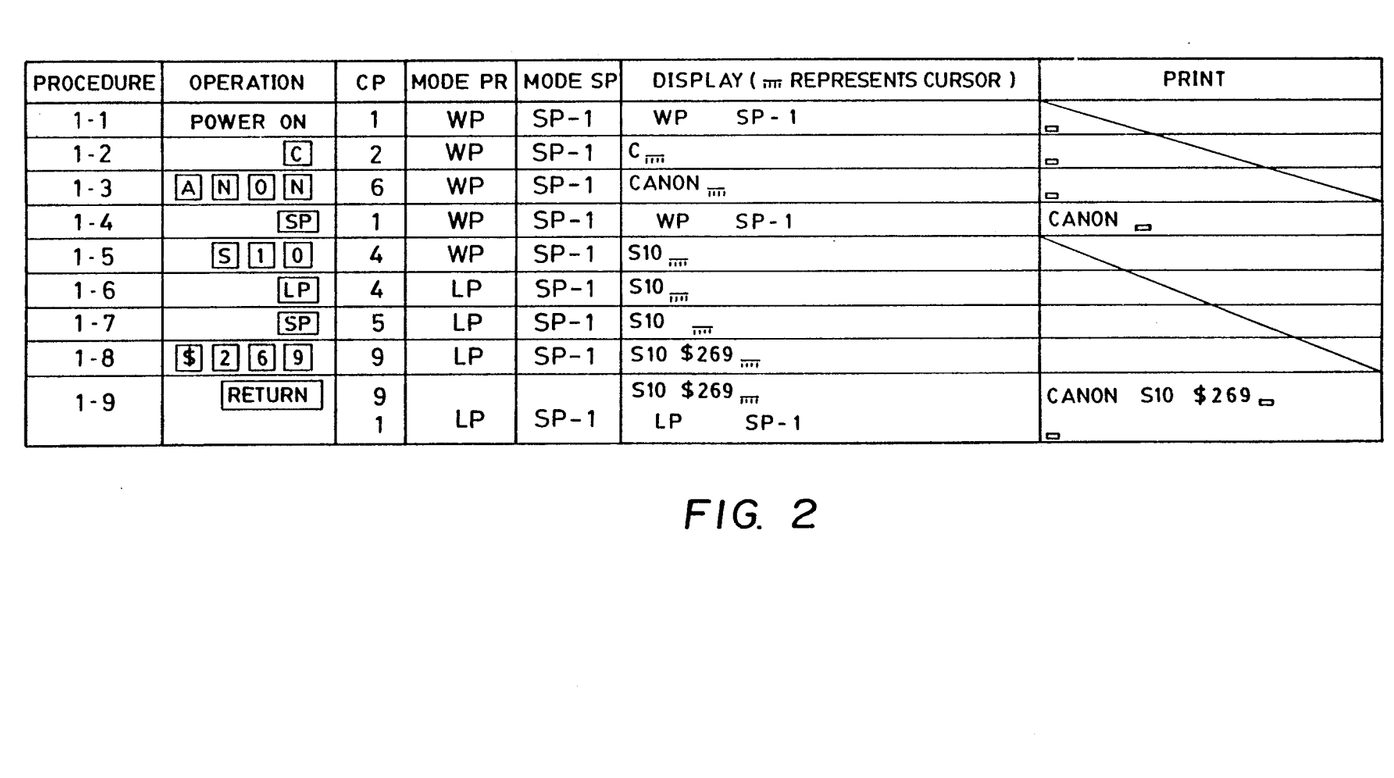
FIG. 2 is a table illustrating the key operations for operation of the electronic apparatus of the first embodiment in various operation modes.
Figures 3, 3A:
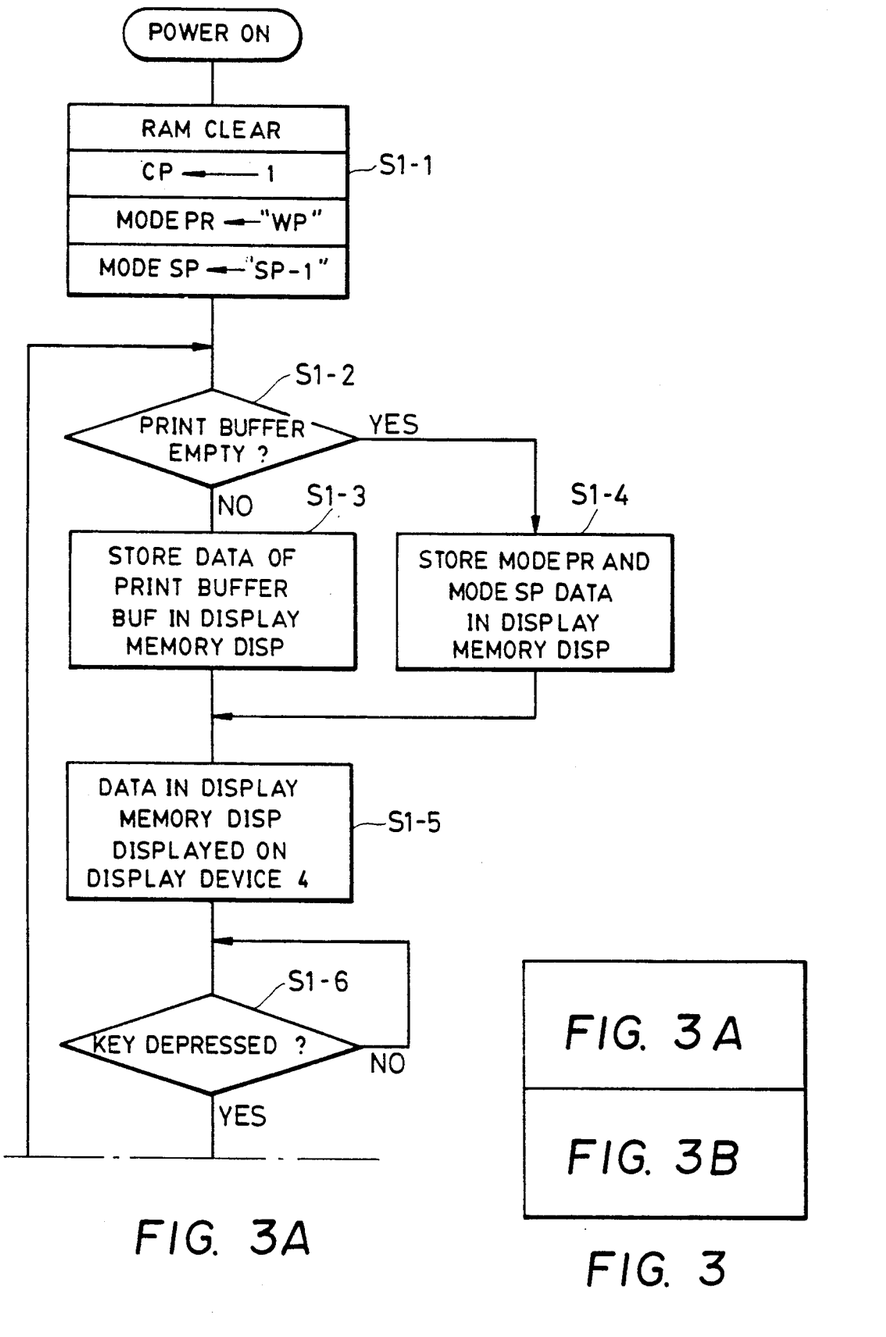
Figure 3B:
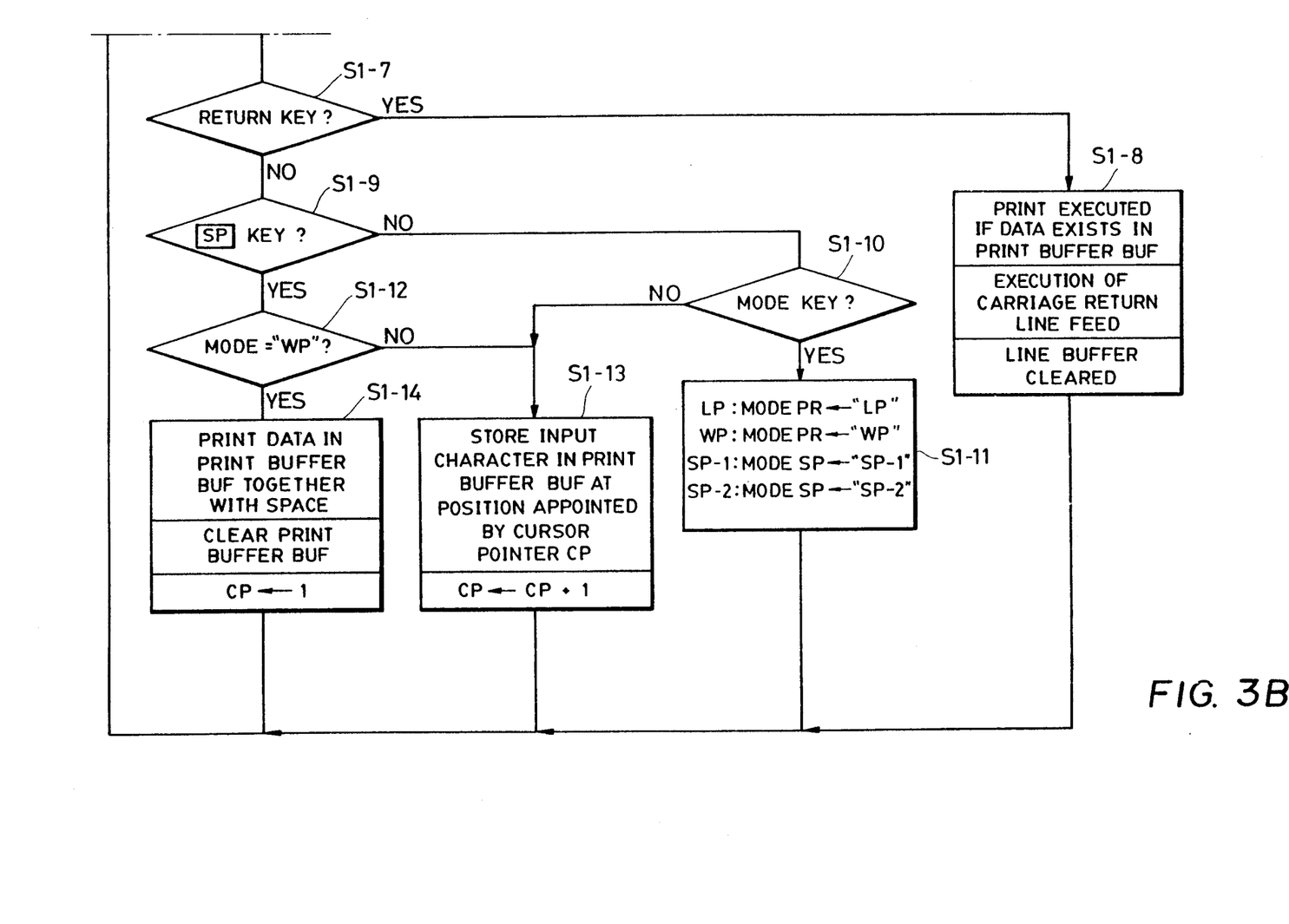

An example of a procedure or a series of key operations in accordance with the first embodiment is shown in FIG. 2, together with the content of the RAM 8 and the actual display on the display device 4, as well as the state of printing performed by the printer 6, caused by these key operations. The control sequence performed by the control unit 12 in response to the key operations is shown in FIGS. 3A and 3B.

The operation of the first embodiment will be described hereinafter with specific reference to FIGS. 2, 3A and 3B.

A power supply switch (not shown) on the keyboard 2 is turned on in Operation 1—1 shown in FIG. 2. As a result, in Step S 1—1 of the flow chart shown in FIG. 3A, all of the memory regions of the RAM 8 are cleared and a position datum "1" is stored in the cursor pointer CP which is adapted to store the position of the cursor on the display device 4. At the same time, a code "WP" representing the word-by-word printing mode and a code "SP-1" representing the first space mode are stored in the printing mode memory MODE PR and in the space mode memory MODE SP of the RAM 8, respectively, in Step S 1—1. Then, a judgement is conducted in Step S 1-2 as to whether any data is stored in the print buffer BUF. Since all regions in the RAM 8 are cleared when the power is turned on, an answer "YES" is obtained in Step S 1-2, so that the process proceeds to Step S 1-4 in which the data "WP" and "SP-1" stored in the printing mode memory MODE PR and the space mode memory MODE SP are put into the display memory DISP. In a subsequent Step S 1-5, the content of the display memory DISP is displayed on the display device 4 and the process process proceeds to Step S 1-6 to wait for depression of a subsequent key.

Referring again to FIG. 2, as an example, the operator depresses an alphanumeric key "C" on the keyboard in Operation 1-2. This is detected in Step S 1-6 in the control flow shown in FIG. 3. The process then proceeds through Steps S 1-7, S 1-9 and S 1-10 to Step S 1-13 in which the inputted character "C" is stored in the position in the print buffer BUF corresponding to the position "1" set in the cursor pointer CP, and the content of the cursor pointer CP is incremented by "1" to become "2".

The process then returns to Step S 1-2. In this case, the answer to the question in Step S 1-2 is "NO" because the print buffer BUF is not empty. The process therefore proceeds to Step S 1-3 in which the content "C" of the print buffer BUF is stored in the display memory DISP, and then to Step S 1-5 in which the alphabet "C" is displayed on the display device 4. In the subsequent Step S 1-6, the control loop is executed to wait for the depression of a key.

In Operation 1-3 of the procedure shown in FIG. 2, alphanumeric keys "A", "N", "O" and "N" are depressed successively, so that "ANON" are stored as new data in the print buffer BUF and the data "ANON" are newly displayed on the display device 4 with steps of the flow chart of FIGS. 3A and 3B described above with reference to display character "C" being repeated. Meanwhile, the content of the cursor pointer CP is changed to "6". Since the word-by-word printing mode "WP" has been set in the printing mode memory MODE PR, the printing is not initiated by Operation 1-3 in FIG. 2.

In Operation 1-4 of the procedure shown in FIG. 2, the operator depresses the space key SP. In response to this key operation, the control unit detects the content "WP" of the printing mode memory MODE PR, through Steps S 1-6, S 1-7, S 1-9 and S 1-12. Since the answer "YES" is derived in Step S 1-12, the process proceeds to Step S 1-14 in which the data CANON stored in the print buffer is printed followed by a space corresponding to one character, and the content of the print buffer BUF is cleared, while "1" is set again in the cursor pointer CP.

The process then returns to Step S 1-2. In this state, the print buffer BUF is judged to be empty, i.e., the answer "YES" is derived in Step S-1-2, so that the process proceeds to Step S 1-4 in which the content "WP" of the printing mode memory MODE PR and the content "SP-1" of the space mode memory MODE SP are stored in the display memory DISP. Consequently, the operation mode as shown in the line corresponding to Operation 1-4 of the procedure illustrated in FIG. 2 is displayed on the display device 4, in the subsequent Step S 1-5. Thus, the mode in which the electronic typewriter is currently set to operate is displayed after printing of the stored data.

Then, in Operation 1-5 of the procedure shown in FIG. 2, the operator successively depresses keys "S", "1" and "0", so that the same control process as that conducted in response to Operation 1-2 is executed, whereby data "S10" is stored in the print buffer BUF. This content of the print buffer BUF is displayed on the display device 4, as shown in FIG. 2. Printing, however, is not initiated because the space key SP has not been yet depressed.

As shown in Operation 1-6 of the procedure shown in FIG. 2, the operator may select the line-by-line printing mode by actuating the line-by-line printing mode key LP, from among the mode setting keys MOD, so that data "LP" are stored in the printing mode memory MODE PR in Step S 1-11 by the execution of Steps S 1-6, S 1-7, S 1-9 and S 1-10. The process then returns to Step S 1-2. Thus, the content of the cursor pointer CP and the content of the display are not changed from those obtained in Operation 1-5.

In Operation 1-7 of the procedure shown in FIG. 2, the operator depresses the space key SP. In this case, however, printing is not performed because the printing mode has been changed to the line-by-line printing mode. Namely, the process proceeds to Step S 1-13 by the execution of Steps S 1-6, S 1-7, S 1-9 and S 1-12. In Step S 1-13, the content of the cursor pointer CP is increased by "1" to become "5", and the process again returns to Step S 1-2.

In Operation 1-8 shown in FIG. 2, the operator depresses alphanumeric keys "$", "2", "6" and "9" successively. Then, steps are followed in the same sequence as those in Operation 1-2 and Operation 1-3, so that the data as shown in Operation 1-8 in FIG. 2 are displayed.

In the final Operation 1-9 of the procedure shown in FIG. 2, the operator depresses the return key RTN. This means that the input of the data to be printed in one line has been completed. In response to this key operation, the process proceeds through Steps S 1-6 and S 1-7 to Step S 1-8 in which the data "S10 $269" stored in the print buffer BUF are printed and the line buffer is cleared after execution of carriage return and line feed.

The process then returns to Step S 1-2, so that the contents of the printing mode memory MODE PR and space mode memory MODE SP are stored in the display memory DISP in Step S 1-4. Thereafter, "LP SP-1" is displayed on the display device 4 as shown in the line representing Operation 1-9 in FIG. 2 to display the mode in which the electronic typewriter is now set to operate.

B. Description of the Second Embodiment

Another electronic typewriter in accordance with a second embodiment of the present invention will be described hereinafter. The second embodiment includes the same elements as does the first embodiment illustrated in FIG. 1 but these elements may be arranged to operate in a slightly different way.

Figure 4:
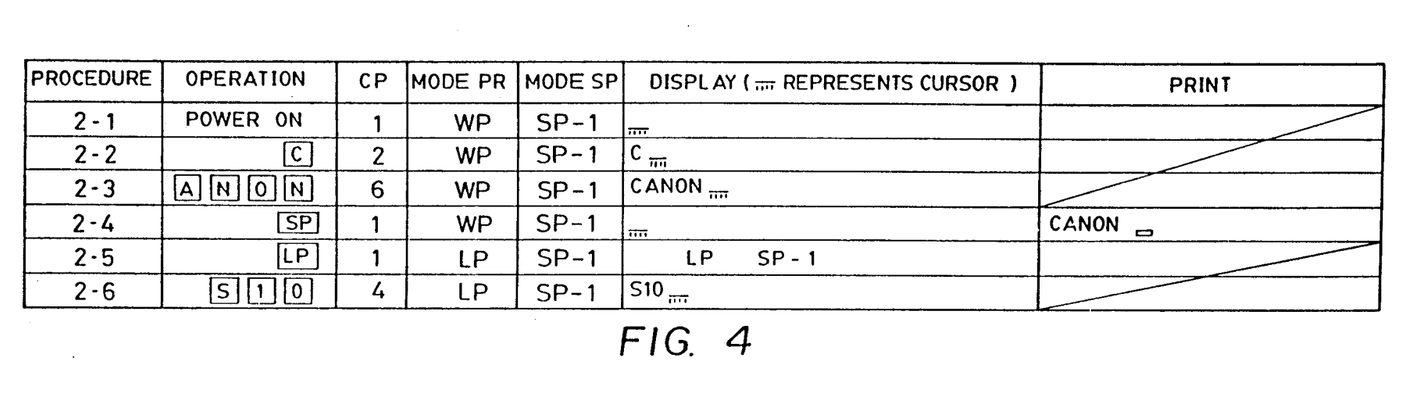
FIG. 4 is a table illustrating the key operations for operation of the electronic apparatus in accordance with a second embodiment of the present invention in various operation modes.

An example of a procedure or a series of key operations in accordance with the second embodiment is shown in FIG. 4, together with the content of the RAM 8 and the various stages of display by the display device 4, as well as the various stages of printing performed by the printer 6, caused by these key operations. The control sequence performed by the control unit 12 in response to the key operations of FIG. 4 is shown by the flow chart of FIGS. 5A and 5B.

Figure 5:
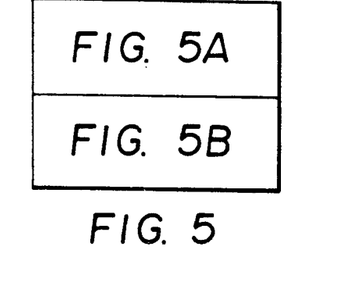
Figure 5A:
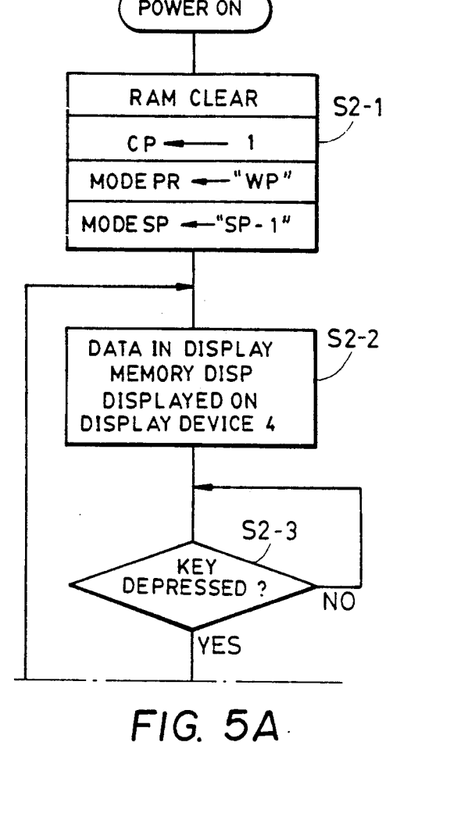
Figure 5B:
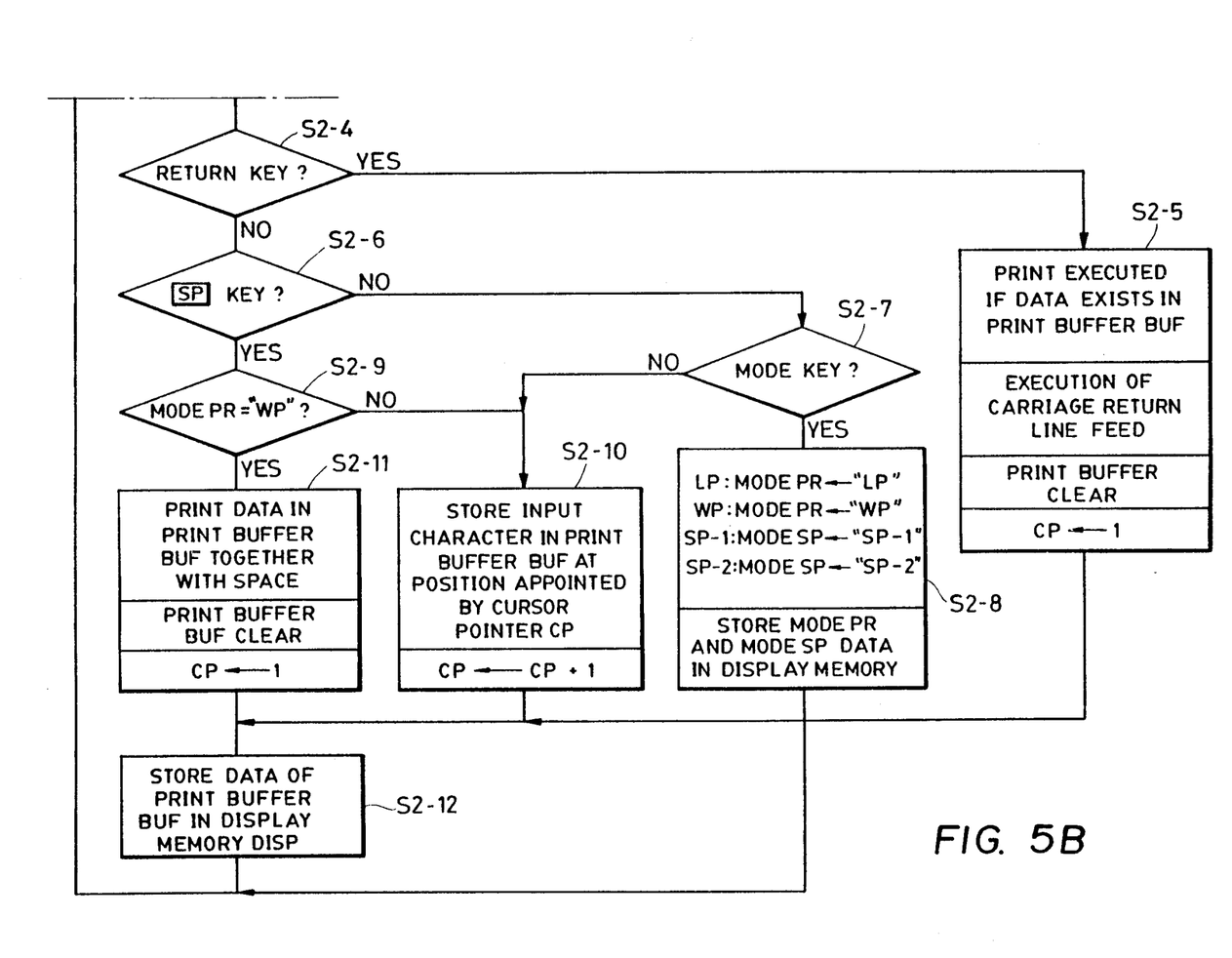

The operation of the second embodiment of the present invention will be described hereinafter with specific reference to FIGS. 4, 5A and 5B.

A power supply switch (not shown) on the keyboard 2 is turned on in Operation 2-1 shown in FIG. 4. As a result, in Step S 2-1 of the flow chart shown in FIG. 5A, all of the memory regions of the RAM 8 are cleared and a position datum "1" is stored in the cursor pointer CP which is adapted to store the position of the cursor on the display device 4. At the same time, a code "WP" representing the word-by-word printing mode and a code "SP-1" representing the first space mode are stored in the printing mode memory MODE PR and in the space mode memory MODE SP of the RAM 8, respectively, in Step S 2-1.

In the subsequent Step S 2—2, the content of the display memory DISP is displayed on the display device 4. Since no data is yet stored in the display memory, only the cursor display as shown in the line of FIG. 1 corresponding to Operation 2-1. The process then proceeds to Step S 2-3 to wait for subsequent depression of another key.

Referring again to FIG. 4, as an example, the operator depresses an alphanumeric key "C" on the keyboard in Operation 2—2. This operation is detected in Step S 2-3 in the flow chart shown in FIG. 5A. The process then proceeds through Steps S 2-3, S 2-4, S 2-6 and S 2-7 to Step S 2-10 in which the input character "C" is stored in the position in the print buffer BUF corresponding to the position "1" set in the cursor pointer CP, and the content of the cursor pointer CP is incremented by "1" to become "2".

Subsequently, the datum "C" in the print buffer BUF is stored in the display memory DISP in Step S 2-12. The process then returns to Step S 2—2 so that the character "C" is displayed on the display device 4. Then, the control loop is executed in the subsequent Step S 2-3 to wait for subsequent depression of yet another key.

In Operation 2-3 of the procedure shown in FIG. 4, alphanumeric keys "A", "N", "O" and "N" on the keyboard 2 are depressed successively. The same steps as those in Operation 2—2 are followed: namely, the data "ANON" is stored as new data in the print buffer BUF and the data "ANON" is newly displayed on the display device 4. Meanwhile, the content of the cursor pointer CP is incremented to "6". Since the word-by-word printing mode "WP" has been set in the printing mode memory MODE PR, the printing is not initiated by Operation 2-3 in FIG. 4.

In Operation 2-4 of the procedure shown in FIG. 4, the operator depresses the space key SP. In response to this key operation, the control unit detects the content "WP" of the printing mode memory MODE PR, by the execution of Steps S 2-3, S 2-4, S 2-6 and S 2-9. Since the answer "YES" is obtained in Step S 2-9, the process proceeds to Step S 2-11 in which the data CANON stored in the print buffer BUF is printed followed by a space corresponding to one character, and the content of the print buffer BUF is cleared after the printing, while "1" is set again in the cursor pointer CP.

Then, the data in the print buffer BUF is stored in the display unit DISP in Step S 2—2, so that only the cursor is displayed in this execution of Step S 2—2. The process then proceeds to the control loop of Step S 2-3 to await subsequent depression of another key.

In Operation 2-5 of the procedure shown in FIG. 4, as an example, the operator depresses the line-by-line printing mode key LP, from among the mode setting keys MOD, so that data "LP" are stored in the printing mode memory MODE PR in Step S 2-8 after execution of Steps S 2-3, S 2-4, S 2-6 and S 2-7. In Step S 2-8, the data in the printing mode memory MODE PR and the space mode memory MODE SP are input to the display memory DISP, and the contents "LP", "SP-1" of the latter are then displayed on the display device in Step S 2—2. Thus, the printing mode of the electronic typewriter is changed from the word-by-word printing mode to the line-by-line printing mode.

Then, in Operation 2-6 of the procedure shown in FIG. 4, the operator successively depresses keys "S", "1" and "0", so that the same control process as that conducted in response to Operation 2—2 is executed, whereby data "S10" are stored in the print buffer BUF. This content of the print buffer BUF is displayed on the display device 4, as shown in the line corresponding to Operation 2-6 in FIG. 4. Printing, however, is not initiated because the carriage return key RTN has not yet been depressed.

In the process of operation of the second embodiment of the present invention described above, once the contents of the printing mode memory MODE PR and the space mode memory MODE SP are displayed in Step S 2—2, the display of these contents is maintained until the process proceeds to Step S 2-3. This procedure, however, is not the only way in which the second embodiment may operate. This second embodiment may be modified so that a timer counter 15 shown in FIG. 1 operates to enable the data in the print buffer BUF to be stored in the display memory DISP only after a predetermined time has elapsed, or so that storage of the data in the display memory DISP occurs immediately after the operator's finger has left the MODE key or when the MODE key is again depressed.

C. Description of the Third Embodiment

Still another electronic typewriter in accordance with a third embodiment of the present invention will be described below. The third embodiment have the same blocks as the first embodiment shown in FIG. 1.

Figure 6:
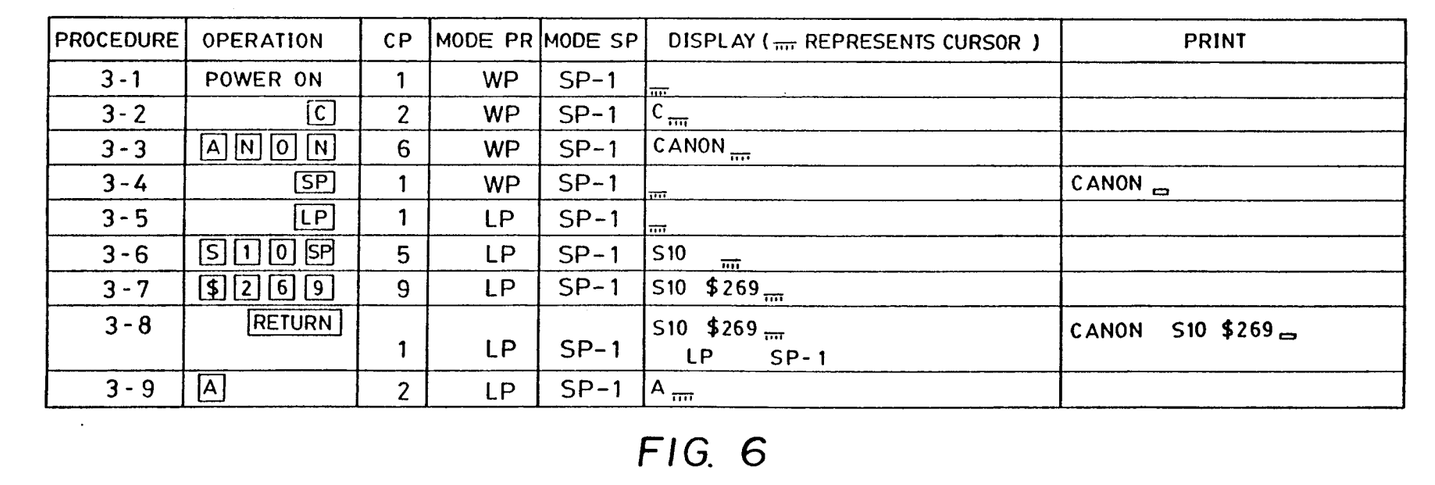
FIG. 6 is a table illustrating the key operations for operation of the electronic apparatus of a third embodiment of the present invention in various operation modes.

An example of a procedure or a series of key operations in accordance with the third embodiment is shown in FIG. 6, together with the content of the RAM 8 and the various stages of display by the display device 4, as well as the various stages of printing performed by the printer 6, caused by these key operations. The control sequence performed by the control unit 12 in response to the key operations is shown in the flow chart of FIGS. 7A and 7B.

Figure 7:
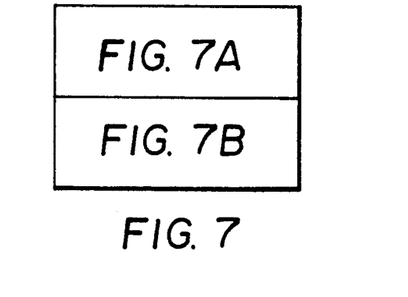
Figure 7A:
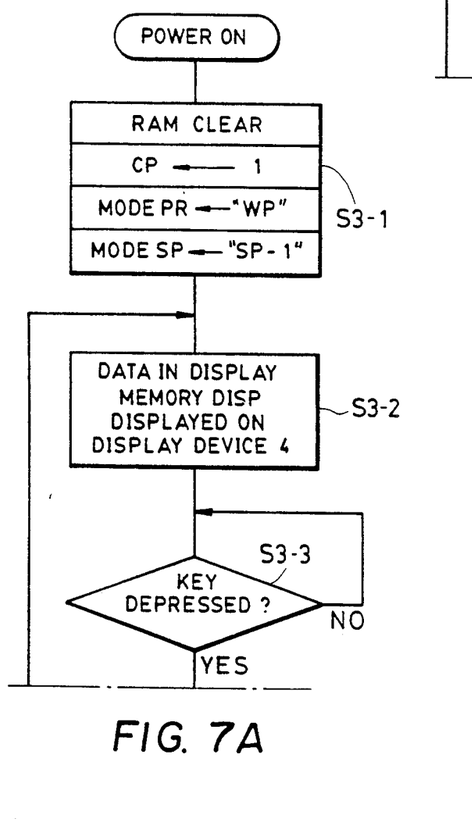
Figure 7B:
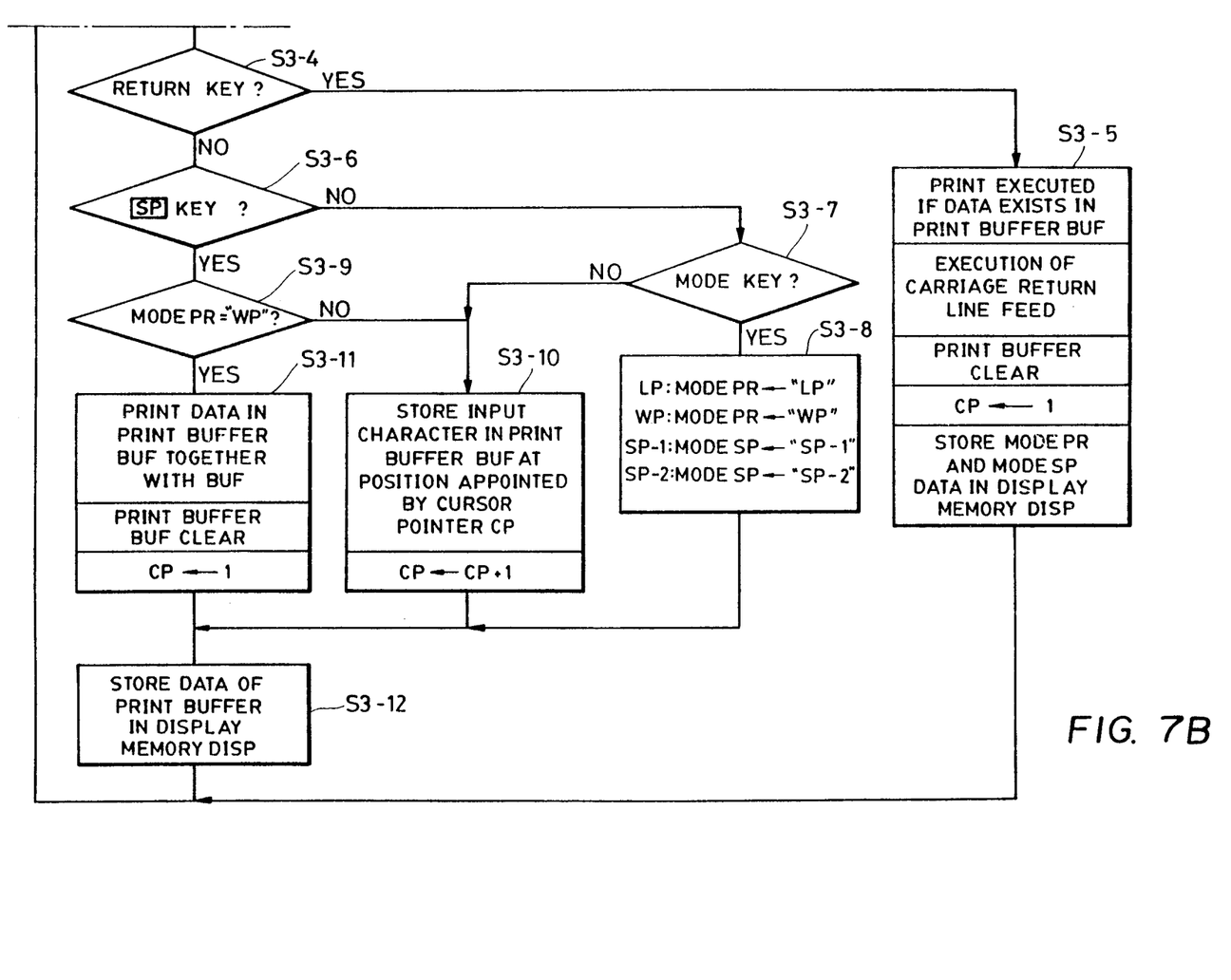

The operation of the first embodiment will be described below hereinafter with specific reference to FIGS. 6 and 7A and 7B. The elements of this third embodiment are the same as those shown in FIG. 1 but again, these elements may be arranged to operate in a slightly different manner.

A power supply switch (not shown) on the keyboard 2 is turned on in Operation 3-1 shown in FIG. 6. As a result, in Step S 3-1 of the flow chart shown in FIG. 7A, all of the memory regions of the RAM 8 are cleared and a position data "1" is stored in the cursor pointer CP which is adapted to store the position of the cursor on the display device 4. At the same time, a code "WP" representing the word-by-word printing mode and a code "SP-1" representing the first space mode are stored in the printing mode memory MODE PR and in the space mode memory MODE SP of the RAM 8, respectively, in Step S 3-1.

In the subsequent Step S 3-2, the content of the display memory DISP is displayed on the display device 4. However, since the display memory is empty at this time, only the cursor is displayed. The process then proceeds to Step S 3—3 to wait for subsequent depression of another key.

Referring again to FIG. 6, as an example, the operator depresses an alphanumeric key "C" on the keyboard in Operation 3-2. This is detected in Step S 3—3 in the flow chart shown in FIG. 7A. The process then proceeds through Steps S 3—3, S 3-4 and S 3-7 to Step S 3-10 in which the input character "C" is stored in the position in the print buffer BUF corresponding to the position "1" set in the cursor pointer CP, and the content of the cursor pointer CP is incremented by "1" to become "2".

Subsequently, the data "C" in the print buffer BUF are stored in the display memory DISP in Step S 3-12. The process then returns to Step S 3-2 so that character "C" is displayed on the display device 4. Then, the control loop is executed in the subsequent Step S 3—3 to wait for depression of another key.

In Operation 3—3 of the procedure shown in FIG. 6, alphanumeric keys "A", "N", "O" and "N" on the keyboard 2 are depressed successively. The same steps as those in Operation 3-2 are followed, namely, the data "ANON" are stored as new data in the print buffer BUF and the data "ANON" are newly displayed on the display device 4. Meanwhile, the content of the cursor pointer CP is incremented to "6". Since the word-by-word printing mode "WP" has been set in the printing mode memory MODE PR, the printing is not initiated by Operation 3—3 in FIG. 6.

In Operation 3-4 of the procedure shown in FIG. 6, the operator depresses the space key SP. In response to this key operation, the control unit detects the content "WP" of the printing mode memory MODE PR by executing Steps S 3—3, S 3-4, S 3-6 and S 3-9. Since the answer "YES" is derived in Step S 3-9, the process proceeds to Step S 3-11 in which the data CANON stored in the print buffer BUF is printed followed by a space corresponding to one character, and the content of the print buffer BUF is cleared after printing, while "1" is set again in the cursor pointer CP.

Then, the data in the print buffer BUF is stored in the display unit DISP in Step S 3-2, so that only the cursor is displayed in Step S 3-2. The process then proceeds to Step S 3—3 to await depression of yet another key.

In Operation 3-5 of the procedure shown in FIG. 6, the operator depresses the line-by-line printing mode key LP, from among the mode setting keys MOD, so that data "LP" are stored in the printing mode memory MODE PR in Step S 3-8 after execution of Steps S 3—3, S 3-4, S 3-6 and S 3-7. The process then proceeds through Steps S 3-12 and S 3-2 to Step S 3—3 to wait for depression of another key. Thus, the printing mode of the electronic typewriter is changed from the word-by-word printing mode to the line-by-line printing mode by the operations described above.

Then, in Operation 3-6 of the procedure shown in FIG. 6, the operator successively depresses keys "S", "1" and "0" and the space key "SP", so that the same control process as that conducted in response to Operation 3-2 and Operation 3—3 is executed, whereby data "S10" and a space are stored in the print buffer BUF. This content of the print buffer BUF is displayed on the display device 4, as shown by the line corresponding to operation 3-6 in FIG. 6. Printing, however, is not initiated because the carriage return key RTN has not yet been depressed.

In Operation 3-7 shown in FIG. 6, the operator depresses alphanumeric keys "$", "2", "6" and "9" successively. Then, steps are followed in the same sequence as those in Operation 3-2 and Operation 3—3, so that the data as shown in the line corresponding to Operation 3-7 in FIG. 6 are displayed.

In the final Operation 3-8 of the procedure shown in FIG. 6, the operator depresses the return key RTN. This means that input of data to be printed in one line has been completed. In response to this key operation, the process proceeds through Steps S 3—3 and S 3-4 to Step S 3-5 in which the data "S10 $269" stored in the print buffer BUF is printed and the line buffer is cleared after execution of carriage return and line feed.

In Step S 3-5, contents of the printing mode memory MODE PR and space mode memory MODE SP are stored in the display memory DISP. In consequence, "LP SP-1" are displayed on the display device 4 instead of "S10 $269".

Then, as the alphanumeric key "A" is depressed in Operation 3-9 of FIG. 6, the character "A" is displayed on the display device 4 in place of "LP SP-1".

Although the invention has been described with specific reference to preferred embodiments thereof, it is to be understood that the described embodiments are only illustrative and various changes and modifications may be made to them without departing from the scope of the invention as set forth in the appended claims.

What is claimed is:

1. An electronic apparatus comprising:
   input means for inputting character data and mode information;
   first memory means for storing the character data input by said input means;
   mode memory means for storing the mode information input by said input means;
   second memory means for storing the character data stored in said first memory means;
   display means for displaying the character data stored in said second memory means;
   printing means for printing character data stored in said first memory means; and
   control means for controlling the mode information to store the mode information in said second memory means, and for controlling said display means to display the mode information, when said first memory means contains no character data to be printed.

2. An electronic apparatus according to claim 1, wherein said display means display character data and the mode information with the character data.

3. An electronic apparatus according to claim 1, further including means for feeding the paper for receiving printed data thereon, and wherein the mode of operation determines the amount of feed of paper by said feeding means during printing by said printing means.

4. An electronic apparatus according to claim 1, further comprising a space key for providing a space between character data printed by said printing means, and a line-change key for changing lines of character data printed by said printing means, and wherein the mode of operation determines that printing by said printing means is to be performed in response to depression of one of said space key and said line-change key.

5. An electronic apparatus according to claim 1, wherein said display means comprises a one-line display.

6. An electronic apparatus comprising:
   input means for inputting character data and data representing a print mode of said apparatus;
   memory means for storing character data input by said input means;
   display means for displaying the character data input by said input means, said display means having display memory means for storing the character data to be displayed and the print mode to be displayed;
   printing means for printing the character data stored in said memory means in accordance with the data representing the print mode input by said input means; and
   control means for controlling said display means to display the print mode information in the form of characters after printing the character data stored in said memory means.

7. An electronic apparatus according to claim 6, wherein said printing instruction means includes at least one of a line-change key for changing lines of character data printed by said printing means and a space key for providing a space between character data printed by said printing means.

8. An electronic apparatus according to claim 6, wherein said control means enables said display means to display the print mode selected by said input means, while clearing said memory means.

9. An electronic apparatus according to claim 6, further comprising means for feeding paper on which data is printed by said printing means, and wherein a print mode set by said input means determines the amount of feed of paper by said feeding means, and other print modes set by said input means include a line-by-line printing mode and a word-by-word printing mode.

10. An electronic apparatus according to claim 6, wherein said display means comprises a one-line display.

11. An electronic apparatus comprising:
   input means for inputting character data, a space character, a carriage return, and first and second print modes;
   first memory means for storing the character data input by said input means;
   display means for displaying the character data input by said input means, said display means having display memory means for storing the character data to be displayed and the first and second print modes to be displayed;
   printing means for printing the character data input by said input means;
   first print control means for controlling said printing means to print the character data stored in said first memory means when a space character is input by said input means and when said apparatus operates in the first print mode;
   second print control means for controlling said printing means to print the character data stored in said first memory means when a carriage return is input by said input means and when said apparatus operates in the second print mode; and
   control means for controlling said display means to display first print mode or second print mode information in the form of characters, after said printing means prints the character data stored in said first memory means.

12. An electronic apparatus according to claim 11, wherein said input means comprises a keyboard.

13. An electronic apparatus according to claim 11, wherein said display means includes a liquid crystal display device.

14. An electronic apparatus according to claim 11, where in said display means comprises a one-line display.

* * * * *

UNITED STATES PATENT AND TRADEMARK OFFICE
CERTIFICATE OF CORRECTION

PATENT NO. : 5,307,448
DATED : April 26, 1994
INVENTOR(S) : SHIGERU MATSUYAMA

It is certified that error appears in the above-indentified patent and that said Letters Patent is hereby corrected as shown below:

COVER PAGE

AT [73] ASSIGNEE

"Canon Kabushiki Kaihsa" should read -- Canon Kabushiki Kaisha --.

COLUMN 2

Line 27, "drawing." should read -- drawings. --.

COLUMN 4

Line 61, "alphabet" should read -- letter --.

COLUMN 8

Line 5, "have" should read -- has --.
Line 16, "first" should read -- third --.

COLUMN 10

Line 18, "display" (second occurrence) should read -- displays --.
Line 19, "with the character data." should read -- in the form of characters. --.
Line 22, "of opera" should read -- information --.
Line 23, "tion" should be deleted.

UNITED STATES PATENT AND TRADEMARK OFFICE
CERTIFICATE OF CORRECTION

PATENT NO. : 5,307,448  
DATED : April 26, 1994  
INVENTOR(S) : SHIGERU MATSUYAMA Page 2 of 3

It is certified that error appears in the above-indentified patent and that said Letters Patent is hereby corrected as shown below:

COLUMN 10

Line 30, "of operation" should read -- information --.  
Line 39, "memory means" should read -- character data memory means --.  
Line 42, "input means," should read -- input means; --, and "said display means having" should be deleted.

Line 47 "memory means" should read -- character data memory means --.  
Line 51, "information in" should read -- information, stored in said display memory means, in --.  
Line 53, "memory means" should read -- character data memory means. --.  
Line 55, "printing instruction means" should read -- input means --.

COLUMN 11

Line 13, "input means," should read -- input means; --, and "said display means having" should be deleted.

UNITED STATES PATENT AND TRADEMARK OFFICE
CERTIFICATE OF CORRECTION

PATENT NO. : 5,307,448
DATED : April 26, 1994
INVENTOR(S) : SHIGERU MATSUYAMA

It is certified that error appears in the above-indentified patent and that said Letters Patent is hereby corrected as shown below:

COLUMN 12

Line 10, "mation in" should read -- mation stored in said display memory means, in --.
Line 19, "where in" should read -- wherein --.

Signed and Sealed this

Eighteenth Day of October, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,307,448
DATED : April 26, 1994
INVENTOR(S) : Shigeru Matsuyama

It is certified that error appears in the above-indentified patent and that said Letters Patent is hereby corrected as shown below:

Column 10, line 44, "data to" should read --data stored in said character data memory means to --, and "and" should read --or--.

Column 11, line 15, "data to" should read -- data, stored in said first memory means, to--, and "and" should read --or--.

Signed and Sealed this

Fourth Day of April, 1995

Attest:

BRUCE LEHMAN

Attesting Officer        Commissioner of Patents and Trademarks